(12) United States Patent
Gerardiere et al.

(10) Patent No.: US 9,835,475 B2
(45) Date of Patent: Dec. 5, 2017

(54) INDUCTIVE SENSOR FOR MEASURING THE POSITION OF A SHAFT OF A VEHICLE

(71) Applicants: CONTINENTAL AUTOMOTIVE FRANCE, Toulouse (FR); CONTINENTAL AUTOMOTIVE GmbH, Hannover (DE)

(72) Inventors: Olivier Gerardiere, Tournefeuille (FR); Alain Fontanet, Muret (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 202 days.

(21) Appl. No.: 14/952,411

(22) Filed: Nov. 25, 2015

(65) Prior Publication Data
US 2016/0146637 A1    May 26, 2016

(30) Foreign Application Priority Data
Nov. 26, 2014    (FR) ...................................... 14 61493

(51) Int. Cl.
  G01D 5/20    (2006.01)
(52) U.S. Cl.
  CPC ......... G01D 5/2073 (2013.01); G01D 5/2053 (2013.01)
(58) Field of Classification Search
  CPC ...... G01D 5/20; G01D 5/2053; G01D 5/2066; G01D 5/2073; G01D 5/22; G01D 5/225
  See application file for complete search history.

(56) References Cited

U.S. PATENT DOCUMENTS

| 6,175,232 B1* | 1/2001 | De Coulon .......... G01D 5/2006 324/207.12 |
| 6,249,234 B1 | 6/2001 | Ely et al. |
| 2001/0001430 A1 | 5/2001 | Ely et al. |

(Continued)

FOREIGN PATENT DOCUMENTS

| CN | 2204994 | 8/1995 |
| CN | 101487689 | 4/2011 |

(Continued)

OTHER PUBLICATIONS

French Search Report, dated Jul. 14, 2015, from corresponding French Application.

Primary Examiner — Son Le
(74) Attorney, Agent, or Firm — Young & Thompson

(57) ABSTRACT

An inductive sensor for measuring the position of a shaft of a vehicle in a first direction (X) and a second direction (Y), from a target mounted on the shaft. The sensor (20) includes a printed circuit board (21) including at least one first receiving coil (23), at least one second receiving coil (24) and at least one transmitting coil (22) surrounding the first receiving coil and the second receiving coil. The first receiving coil and the second receiving coil each include a plurality of N portions (23A, 23B, 23C, 24A, 24B, 24C) that are electrically connected to one another and are disposed side by side on the printed circuit in the second direction, each portion extending on the printed circuit in the first direction in such a way as to determine the position of the target both in the first direction and in the second direction.

15 Claims, 3 Drawing Sheets

(56) References Cited

U.S. PATENT DOCUMENTS

| | | | | |
|---|---|---|---|---|
| 2006/0290346 A1* | 12/2006 | Habenschaden | ..... | G01D 5/2013 324/207.16 |
| 2009/0140729 A1* | 6/2009 | Roziere | ................ | G01D 5/2291 324/207.17 |
| 2014/0035564 A1* | 2/2014 | Lee | ........................ | G01D 5/204 324/207.12 |
| 2014/0225600 A1 | 8/2014 | Fontanet et al. | | |

FOREIGN PATENT DOCUMENTS

| | | | | |
|---|---|---|---|---|
| CN | 103534491 | | 1/2014 | |
| CN | 103983283 | | 8/2014 | |
| DE | 102004026311 A1 * | | 12/2005 | ........... G01D 5/2053 |
| DE | 102007027419 | | 12/2008 | |
| EP | 1 135 745 B1 | | 9/2003 | |
| EP | 2715152 | | 4/2014 | |
| WO | 2007/128972 A1 | | 11/2007 | |

\* cited by examiner

INDUCTIVE SENSOR FOR MEASURING THE POSITION OF A SHAFT OF A VEHICLE

FIELD OF THE INVENTION

The present invention relates to the field of measurement sensors, in particular for an automotive vehicle, and relates more particularly to a sensor for measuring the position of a drive shaft in two spatial directions, as well as to an automotive vehicle comprising such a sensor.

BACKGROUND OF THE INVENTION

In an automotive vehicle, it is known to utilize a gearshift lever or an electrical control in order to select a ratio or a function of a gearbox (forward, rear, neutral, parking brake . . . ). This gearshift lever or this electrical control operates a drive shaft connected to the gearbox in order to place it in the position corresponding to the function or to the selected ratio.

It is known to use a sensor for measuring the position of the shaft in order to permit the management of the engine parameters by an electronic control unit of the vehicle. Such a sensor measures the position of the shaft and then transmits this information to the electronic control unit of the vehicle in order to deduce therefrom in particular the engaged ratio or the function of the gearbox. This positional information may be utilized, for example, in order to display the function or the ratio selected by the user.

In the case of an automatic gearbox, in which the shaft moves in a single direction, the position sensor that is used is a linear sensor. In an existing solution, as illustrated in FIG. 1, this sensor 1 is of the inductive type and comprises one transmitting coil 2 and two receiving coils 3, 4 making it possible to detect the position of a target mounted on the shaft, the target passing in front of the sensor in a direction X, by performing measurements of inductive effects between the transmitting coil 2 and the receiving coils 3, 4. These effects are due to the modification of the magnetic coupling between the transmitting coil 2 and each receiving coil 3, 4 when the target is situated in the detection zone of the sensor 1. Thus, by measuring the electrical voltages at the terminals of the receiving coils 3, 4, it is possible in a manner known per se to deduce the precise position of the target. Although such a sensor 1 may be appropriate in the case of an automatic gearbox, it exhibits the disadvantage of determining the position of the shaft in only a single direction X.

In the case of a manual gearbox, however, the positions corresponding to the gear ratios are generally disposed in two ranges and in one position, referred to as the neutral position, situated between these two ranges and not corresponding to the selection of any ratio. As a result, in view of the selection of the ratios by the user, the shaft is, on the one hand, in linear movement in its longitudinal axis when the user moves the gearshift lever from one range of ratios to the other and, on the other hand, in angular movement when the user selects a ratio in the same range. Also, given that the shaft is guided by the gearshift lever both in translation and in rotation, it is necessary to be aware of its position in both directions.

For this purpose, a system comprising a matrix of Hall-effect sensors disposed in two directions in order to form a detection zone in two dimensions is familiar. However, such a system exhibits a number of disadvantages. First of all, the use of a matrix of sensors makes it possible to determine the position of the shaft only in a discrete manner, which restricts the accuracy of the system to the position of each sensor. In addition, the use of a plurality of sensors significantly increases the complexity and the cost of the system while reducing its reliability. Such a matrix also requires a suitable microcontroller for collecting and processing all of the data supplied by each sensor in order to deduce therefrom the position of the target, which makes the system more complex and costly. Finally, the zones between the sensors are so-called sensitive zones, because a target situated between two sensors may not be detected by the matrix, which leads to a malfunctioning of the system and accordingly presents a major disadvantage.

SUMMARY OF THE INVENTION

The invention thus proposes to resolve these disadvantages, at least in part, by proposing a simple, reliable and effective solution for determining the position of a drive shaft in two spatial directions.

For this purpose, the object of the invention is an inductive sensor for measuring the position of a drive shaft of a vehicle in a first direction and in a second direction, perpendicular to the first direction, from a target mounted on said shaft, said sensor comprising a printed circuit board, said printed circuit board comprising at least one first receiving coil, at least one second receiving coil and at least one transmitting coil surrounding the first receiving coil and the second receiving coil and being configured in such a way as to generate an electrical voltage, the first receiving coil and the second receiving coil being arranged in such a way that the electrical voltage generated by the transmitting coil generates a sine signal in the first receiving coil during detection of the target and a cosine signal in the second receiving coil during detection of the target, said sensor being characterized in that the first receiving coil and the second receiving coil each comprise a plurality of N portions that are electrically connected to one another and disposed side by side on the printed circuit in the second direction, each portion extending on the printed circuit in the first direction in such a way as to determine the position of the target, and accordingly that of the shaft, both in the first direction and in the second direction.

Each portion of the plurality of N portions of the first receiving coil is connected electrically to the preceding portion and to the following portion. Likewise, each portion of the plurality of N portions of the second receiving coil is connected electrically to the preceding portion and to the following portion.

The couple of receiving coils is thus electrically continuous along the N portions, which makes it possible to produce sine and cosine signals with a different phase for each point of the N portions in the first direction. The position in the second direction is deduced in a discrete manner from these values of distinct phases. In other words, N consecutive portions of the sine and cosine signals correspond to the N portions of the coils in the second direction.

The sensor according to the invention thus makes it possible to determine the position of the shaft in two directions with a single sensor, which makes the solution easy to install and to maintain while reducing the cost. One obvious solution would have been to utilize a plurality of linear sensors disposed side by side. However, interferences would occur because of the proximity of the sensors in a confined space, for example such as that in which a gearbox shaft is situated. In addition, the use of a plurality of sensors would significantly increase the number of components, and thus the complexity and the cost of the system.

The first receiving coil preferably comprises a plurality of M first meshes, and the second receiving coil comprises a plurality of M second meshes. The first receiving coil and the second receiving coil thus comprise the same number of meshes.

According to one aspect of the invention, each portion of a receiving coil comprises at least one complete mesh having a length L and at least one portion of a mesh.

More preferably, the plurality of M first meshes and the plurality of M second meshes are offset by a length equal to L/2.

According to one characterizing feature of the invention, the sensor comprises an electronic control module configured in order to determine the position of the target in the second direction Y by identifying an interval of the sine signal and/or of the cosine signal corresponding to a given portion of the receiving coils, the position of the target in the direction X being given by the phase value of the sine signal and/or of the cosine signal in said interval.

The position of the target is preferably determined by using the tangential arc of the sine and cosine signals.

The invention also relates to a vehicle, in particular an automotive vehicle, comprising a sensor as described above, a drive shaft and a target made at least in part from a conductive material, mounted on said drive shaft in order to permit the sensor to determine the position of the shaft.

Finally the invention relates to a method of manufacturing a printed circuit board for an inductive sensor for measuring the position of a shaft of a vehicle in a first direction and a second direction, perpendicular to the first direction, from a target mounted on said shaft, said printed circuit comprising at least one first receiving coil, at least one second receiving coil and at least one transmitting coil surrounding the first receiving coil and the second receiving coil and being configured in order to generate an electrical voltage, the first receiving coil and the second receiving coil being arranged in such a way that the electrical voltage generated by the transmitting coil generates a sine signal in the first receiving coil during detection of the target and a cosine signal in the second receiving coil during detection of the target, said method being characterized in that it comprises a stage of disposing the first receiving coil and the second receiving coil in a whole number N of portions disposed side by side on the printed circuit in the second direction, each portion extending on the printed circuit in the first direction in such a way as to determine the position of the target in the first direction and in the second direction.

Other characterizing features and advantages of the invention will become evident in the course of the following description, which is made with regard to the accompanying figures provided by way of non-exhaustive examples and in which identical reference designations are given to similar objects.

BRIEF DESCRIPTION OF THE DRAWINGS

The invention will be better understood from a perusal of the following description, which is provided solely by way of example, and with reference to the accompanying drawings, in which.

DETAILED DESCRIPTION OF THE INVENTION

It should be noted that the figures depict the invention in a detailed manner in order to implement the invention, and said figures can, of course, be used to better define the invention where necessary.

The sensor according to the invention is intended in particular to be mounted in a vehicle, in particular an automotive vehicle, directly above a drive shaft, in order to determine the position thereof with the help of a target mounted on said shaft. This target may be present in a manner known per se in the form of a plaque made from a conductive material permitting the circulation of eddy currents.

Figure 1:
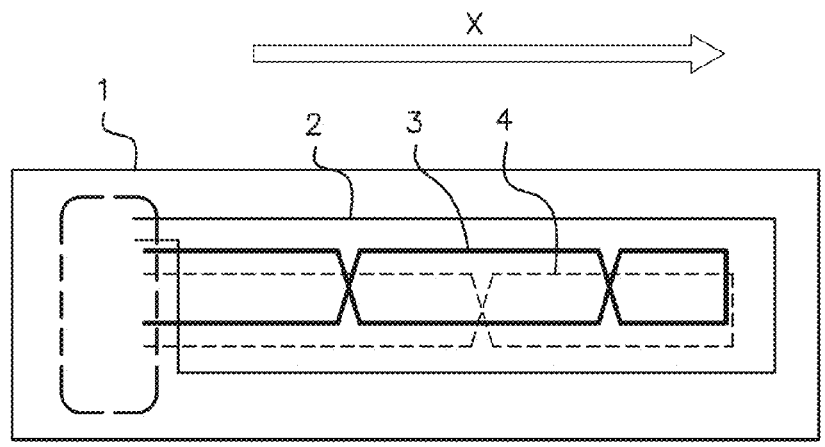
FIG. 1 is a schematic representation of a measurement sensor according to the prior art.
Figure 2:
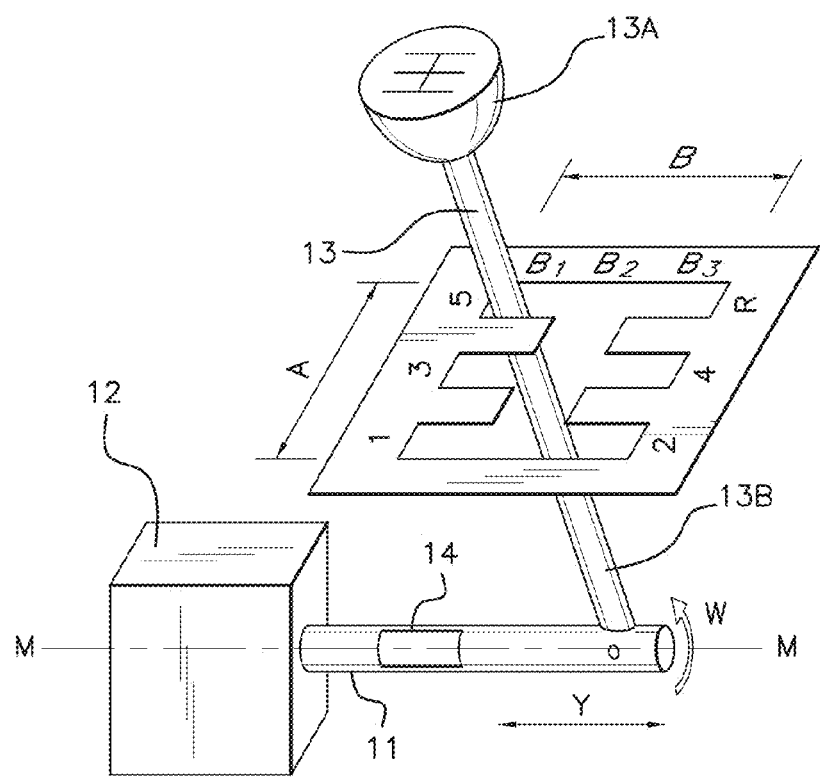
FIG. 2 is a schematic representation of the mechanism permitting the manual changing of a gear ratio.

Consequently, with reference to FIG. 2, the invention will be presented in the case of an automotive vehicle comprising a shaft 11 of a manual gearbox 12 operated by a gearshift lever 13. This example is not a limiting factor for the invention, which applies to any type of vehicle and more broadly to any type of drive shaft, of which it is wished to determine the position.

The gearshift lever 13 comprises one free extremity 13A and one extremity 13B for connection to the shaft 11 in order to operate the gearbox 12. The movement of the gearshift lever 13 is effected by a user by activating the free extremity 13A between different positions, each corresponding to a gear ratio or to the neutral position of the gearbox referred to as the "neutral position".

With reference once again to FIG. 2, the gearshift lever 13 has seven positions corresponding to the five forward ratios 1-5, to a reverse ratio R and to the neutral position. The six positions of the ratios are distributed over two ranges B1, B3, whereas the so-called neutral position is positioned on a range B2, situated between the two ranges of ratios B1, B3. In order to change the ratio, the user moves the gearshift lever 13 in a first direction A in order to pass from one ratio of one range to another ratio of this same range, and in a second direction B in order to pass from one range of ratios to another.

Figure 3:
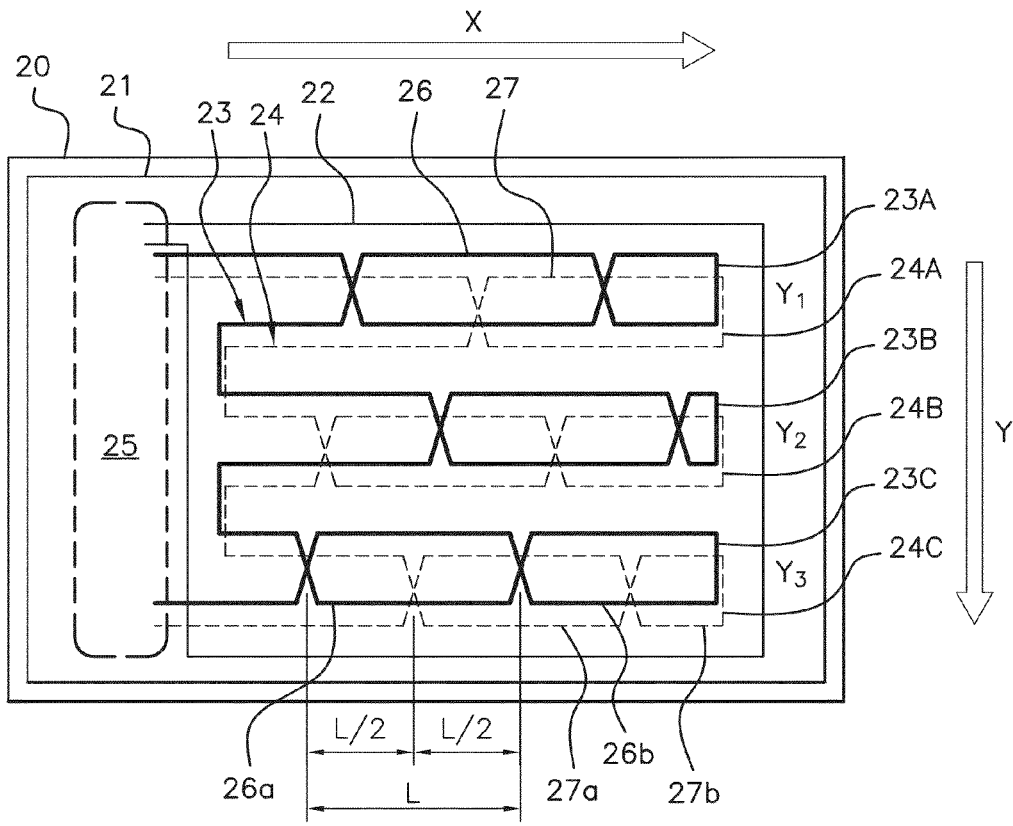
FIG. 3 is a schematic representation of a mode of implementation of the sensor for measuring a position in two directions according to the invention.

With reference to FIG. 3, the sensor 20 according to the invention is an inductive sensor making it possible to measure the position of the shaft 11. The sensor 20 is mounted in the vehicle in a fixed manner directly above the target 14 in such a way as to determine the position of the shaft 11. Such a sensor 20 comprises in a manner known per se a card comprising a printed circuit 21 and an electronic control module 25.

With reference to FIG. 2, when the user selects a ratio within the same range of the gearshift lever, the movement of the shaft 11 is accompanied by an angular movement W about its longitudinal axis MM, of which the projection in the plane of the printed circuit board 21 corresponds to a first direction X. Similarly, when the user moves the gearshift lever 13 from one range of ratios to the other, the movement of the shaft 11 results in a linear movement in its longitudinal axis MM in a second direction Y, perpendicular to the first direction X.

With reference to FIG. 3, the printed circuit board 21 comprises a transmitting coil 22, a single first receiving coil 23 and a single second receiving coil 24. Of course, the printed circuit board 21 may also comprise more than one couple of receiving coils 23, 24.

The transmitting coil 22 is disposed around the receiving coils 23, 24 and is configured in order to generate an electrical voltage in said receiving coils 23, 24. The first receiving coil 23 and the second receiving coil 24 are arranged in such a way that the electrical voltage generated by the transmitting coil 22 generates a sine signal in the first receiving coil 23 during detection of the target 14 and a cosine signal in the second receiving coil 24 during detection of the target 14. The sine signal SIN is thus spread over a phase period of 360°, for example from −180° to +180°, corresponding to the distance between the start and the end of the first coil. similarly, the cosine signal COS is spread over a phase period of 360°, for example from −180° to +180°, corresponding to the distance between the start and the end of the second coil, the sine signal SIN and the cosine signal COS being out of phase by 90°.

According to the invention, the first receiving coil 23 and the second receiving coil 24 each comprise a plurality of N portions disposed side by side on the printed circuit 21 in the second direction Y, each portion extending on the printed circuit 21 in the first direction X and being connected electrically to the preceding portion and to the following portion of the same receiving coil 23, 24. Such an arrangement thus makes it possible to spread the sine and cosine signals, both in the first direction X and in the second direction Y, in order to deduce therefrom the position of the target 14. The first receiving coil 23 and the second receiving coil 24 thus define a detection zone of the target 14 in two dimensions X and Y.

In the example illustrated in FIG. 3, the first receiving coil 23 and the second receiving coil 24 each comprise three portions respectively 23A, 23B, 23C and 24A, 24B, 24C extending in the first direction X and being disposed side by side on the printed circuit 21 in the second direction Y. This is in no way a limiting factor on the scope of the present invention, the first receiving coil 23 and the second receiving coil 24 being able to comprise two portions or more than three portions.

The determination of the position of the shaft in the second direction Y is performed in a discrete manner, each portion respectively 23A, 23B, 23C, 24A, 24B, 24C defining an interval of positions of the shaft in the second direction Y represented by the same position Y1 or Y2 or Y3 from the point of view of the sensor 20.

With reference once again to FIG. 3, the first receiving coil 23 and the second receiving coil 24 differ in respect of their nature. The first receiving coil 23 comprises a plurality of M first meshes 26. Likewise, the second receiving coil 24 comprises a plurality of M second meshes 27. In this example, each portion 23A, 23B, 23C, 24A, 24B, 24C of the plurality of portions of a receiving coil 23, 24 comprises at least one complete mesh 26a, 27a extending for a length L in the first direction X and at least one portion of a mesh 26b, 27b, such that each portion 23A, 23B, 23C, 24A, 24B, 24C contains the equivalent of two complete meshes 26a, 27a, or a total portion length 23A, 23B, 23C, 24A, 24B, 24C equal to 2 L. The first meshes 26 and the second meshes 27 are offset one in relation to the other by a length equal to L/2 in order to dephase the electrical signal generated in the first receiving coil 23 and in the second receiving coil 24.

In order to determine the position of the target in relation to the meshes 26, 27, the size of the target must be smaller than the length L of a complete mesh 26, 27.

In this illustrative embodiment, the second receiving coil 24 is offset in the direction Y in relation to the first coil 23. As a variant, the first receiving coil 23 and the second receiving coil 24 could also be superposed on the printed circuit board 21.

The electronic control module 25 is configured in order to manage the operation of the first receiving coil 23 and of the second receiving coil 24 as well as that of the transmitting coil 22 in order to be able to implement the magnetic coupling and to measure the currents circulating in the first receiving coil 23 and in the second receiving coil 24.

The electronic module 25 measures, in a manner known per se, the voltage at the terminals of the first receiving coil 23 and the second receiving coil 24 generated by the voltage of the transmitting coil 22 and modulated by the passage of the target 14 in the detection zone of the sensor 20. The electronic module 25 is configured in order to generate the sine SIN and cosine COS signals generated by the passage of the target 14 in the detection zone of the sensor 20 from measured voltages.

In an embodiment of the sensor according to the invention, the electronic control module 25 comprises means for determining the position in the two directions X, Y from signals generated during the passage of the target 14 in the detection zone of the sensor 20. In a preferred manner, the sine SIN and cosine COS signals make it possible to deduce a value for the single tangential arc as a function of the position of the target in the detection zone in order to determine the position of the shaft, as explained below in the implementation of the invention.

In an alternative manner, the means for determining the position in the two directions X, Y from signals generated during the passage of the target 14 in the detection zone of the sensor 20 are realized outside of the electronic control module 25. In this case, these means for determining may be internal or external to the sensor 20.

To manufacture the printed circuit board 21, the first receiving coil 23 and the second receiving coil 24 are positioned on the printed circuit board 21 in an arrangement of a plurality of portions 23A, 23B, 23C, 24A, 24B, 24C that are disposed side by side in the second direction Y, each portion 23A, 23B, 23C, 24A, 24B, 24C of the plurality of portions 23A, 23B, 23C, 24A, 24B, 24C extending on the printed circuit 21 in the first direction X by being connected electrically to the preceding portion 23A, 23B, 23C, 24A, 24B, 24C and to the following portion 23A, 23B, 23C, 24A, 24B, 24C in such a way as to determine the position of the target 14 in the first direction X and in the second direction Y.

Figure 4:
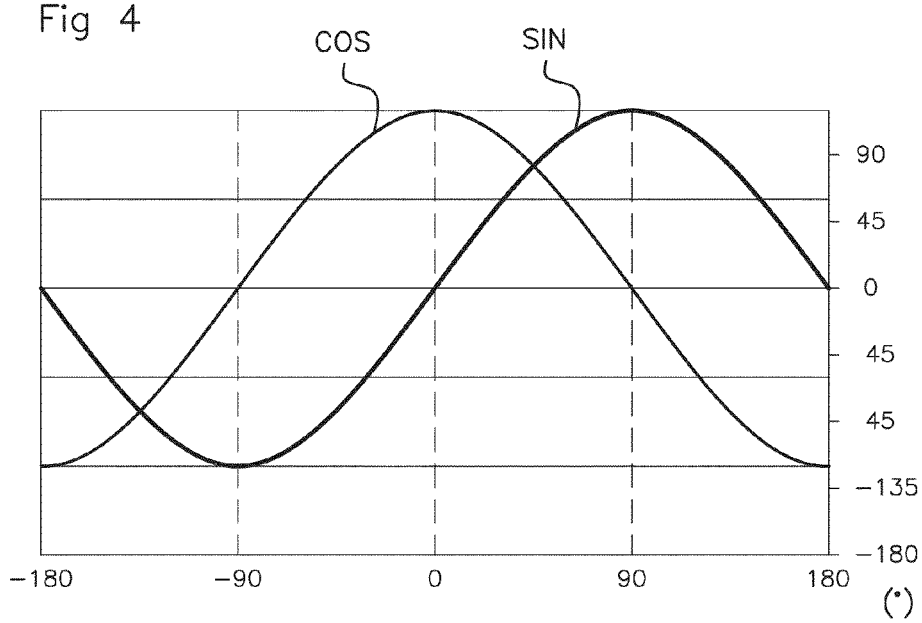
FIG. 4 represents the cosine and sine signals generated by the transmitting coil in the receiving coils.

With reference to FIG. 4, the transmitting coil 22 makes it possible to create a first magnetic coupling with the first receiving coil 23 and a second magnetic coupling with the second receiving coil 24. When a target 14 is situated in proximity to the sensor, the coupling is modified and results in a modification of the current circulating in the receiving coils 23, 24, which may be converted into positional information for the target 14 in relation to said receiving coils 23, 24.

In the event of the target 14 being present in the detection zone of the sensor, the receiving coils 23, 24 that are situated in proximity to the target 14 experience a weaker quantity of flux of the magnetic field than if the target 14 was absent. For example, in the case of a receiving coil 23, 24 constituted by two meshes with opposite directions, with the target 14 moving facing towards one and then the other of these meshes, this receiving coil 23, 24 will experience, in relation to a zero mean value, a relative increase followed by a relative reduction in the quantity of flux of the magnetic field which passes through it.

Figure 5:
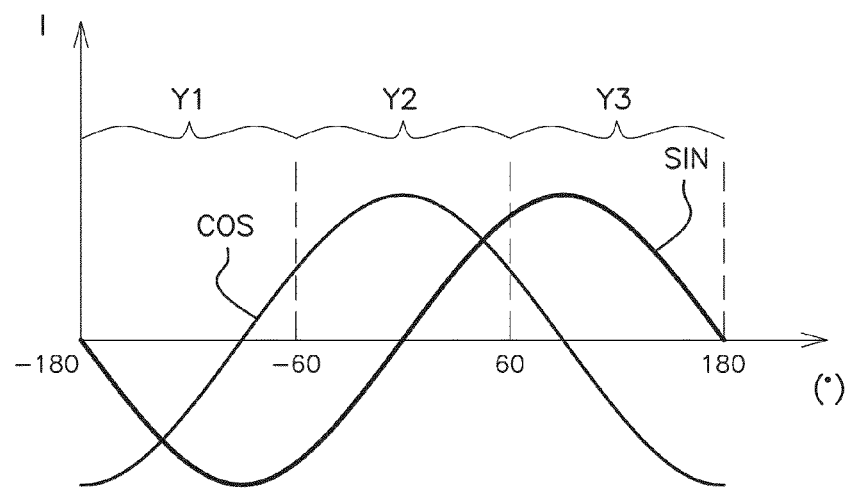
FIG. 5 represents the decomposition of a sine signal provided by the position sensor according to the invention during detection of a target.

With reference to FIG. 5, the sine SIN and cosine COS signals make it possible to identify a first portion 23A, 24A of −180° to −60° corresponding to the position Y1 in the second direction Y, a second portion 23B, 24B of −60° to +60° corresponding to the position Y2 in the second direction Y, and a third portion 23C, 24C of +60° to +180° corresponding to the position Y3 in the second direction Y.

Figure 6:
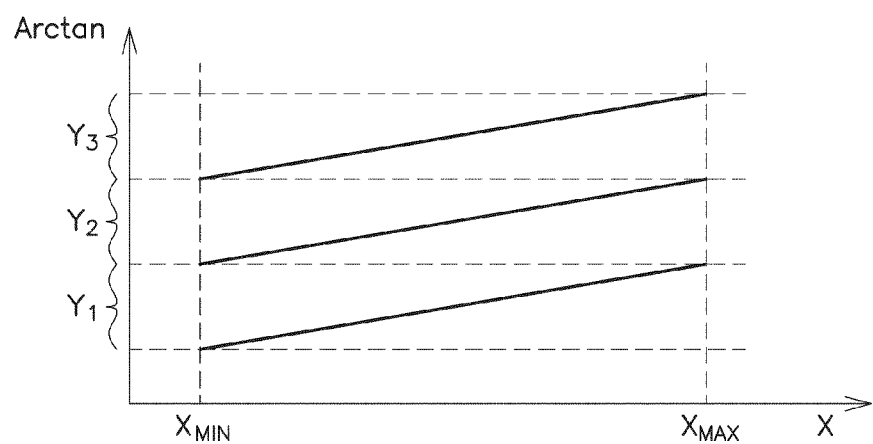
FIG. 6 represents the signal for determining the position of the target in two directions provided by the sensor according to the invention.

The electronic module 25 thus determines the position of the target in the detection zone from the sine and cosine signals from the two receiving coil assemblies by calculating the tangential arc Arctan of these two sine SIN and cosine COS signals, in order to obtain line segments, as illustrated in FIG. 6, each segment corresponding to one of the three portions 23A, 23B, 23C, 24A, 24B, 24C of receiving coils 23, 24 associated respectively with the three positions Y1, Y2, Y3 in the second direction Y.

All the portions 23A, 23B, 23C, 24A, 24B, 24C have their abscissa comprised within the same value interval {Xmin; Xmax} corresponding to the position of the target 14 in the first direction X. The curve obtained makes it possible, from the sine SIN and cosine COS signals, to determine the position of the target 14 in the two directions X and Y. This determination of the position of the target according to the invention is continuous in the first direction X and discrete in the second direction Y.

In another embodiment (not illustrated here) of the sensor according to the invention, a space may be provided between two portions of receiving coils. As a result, since the target is not detected in this space but is detected to either side of said space, the latter may be utilized as a supplementary position that is independent of the first direction X, for example for the neutral position of a gearshift lever.

Thanks to the invention, it is possible to determine the position of the shaft in two directions X, Y with a single sensor generating a single output variable. The arrangement of the receiving coils in a plurality of portions is also easy to manufacture and to implement.

It should be noted, finally, that the present invention is not limited to the examples described above and has the potential for numerous variants that are already familiar to a person skilled in the art.

The invention claimed is:

1. An inductive sensor for measuring the position of a drive shaft (11) of a vehicle in a first direction (X) and a second direction (Y), perpendicular to the first direction (X), from a target (14) mounted on said shaft (11), said sensor (20) comprising a printed circuit board (21), said printed circuit board (21) comprising at least one first receiving coil (23), at least one second receiving coil (24) and at least one transmitting coil (22) surrounding the first receiving coil (23) and the second receiving coil (24) and being configured in such a way as to generate an electrical voltage, the first receiving coil (23) and the second receiving coil (24) being arranged in such a way that the electrical voltage generated by the transmitting coil (22) generates a sine signal (SIN) in the first receiving coil (23) during detection of the target (14) and a cosine signal (COS) in the second receiving coil (24) during detection of the target (14), wherein the first receiving coil (23) and the second receiving coil (24) each comprise a plurality of N portions (23A, 23B, 23C, 24A, 24B, 24C) that are electrically connected to one another and are disposed side by side on the printed circuit (21) in the second direction (Y), each portion (23A, 23B, 23C, 24A, 24B, 24C) extending on the printed circuit (21) in the first direction (X) in such a way as to determine the position of the target (14) both in the first direction (X) and in the second direction (Y).

2. The sensor as claimed in claim 1, wherein the first receiving coil (23) comprises a plurality of M first meshes (26) and the second receiving coil (24) comprises a plurality of M second meshes (27).

3. The sensor as claimed in claim 2, wherein each portion (23A, 23B, 23C, 24A, 24B, 24C) of a receiving coil (23, 24) comprises at least one complete mesh (26a, 27a) having a length L and at least one portion of a mesh (26b, 27b).

4. The sensor as claimed in claim 2, wherein the plurality of M first meshes (26) and the plurality of M second meshes (27) are offset by a length equal to L/2.

5. The sensor as claimed in claim 1, further comprising an electronic control module (25) configured in order to determine the position of the target (14) in the second direction Y by identifying an interval of the sine signal (SIN) and/or of the cosine signal (COS) corresponding to a given portion (23A, 23B, 23C, 24A, 24B, 24C) of the receiving coils (23, 24), the position of the target (14) in the direction X being given by the phase value of the sine signal (SIN) and/or of the cosine signal (COS) in said interval.

6. A vehicle, in particular an automotive vehicle, comprising a sensor (20) as claimed in claim 1, a drive shaft (11) and a target (14) made at least in part from a conductive material, mounted on said drive shaft (11) in order to permit the sensor (20) to determine the position of the shaft (11).

7. The sensor as claimed in claim 3, wherein the plurality of M first meshes (26) and the plurality of M second meshes (27) are offset by a length equal to L/2.

8. The sensor as claimed in claim 2, further comprising an electronic control module (25) configured in order to determine the position of the target (14) in the second direction Y by identifying an interval of the sine signal (SIN) and/or of the cosine signal (COS) corresponding to a given portion (23A, 23B, 23C, 24A, 24B, 24C) of the receiving coils (23, 24), the position of the target (14) in the direction X being given by the phase value of the sine signal (SIN) and/or of the cosine signal (COS) in said interval.

9. The sensor as claimed in claim 3, further comprising an electronic control module (25) configured in order to determine the position of the target (14) in the second direction Y by identifying an interval of the sine signal (SIN) and/or of the cosine signal (COS) corresponding to a given portion (23A, 23B, 23C, 24A, 24B, 24C) of the receiving coils (23, 24), the position of the target (14) in the direction X being given by the phase value of the sine signal (SIN) and/or of the cosine signal (COS) in said interval.

10. The sensor as claimed in claim 4, further comprising an electronic control module (25) configured in order to determine the position of the target (14) in the second direction Y by identifying an interval of the sine signal (SIN) and/or of the cosine signal (COS) corresponding to a given portion (23A, 23B, 23C, 24A, 24B, 24C) of the receiving coils (23, 24), the position of the target (14) in the direction X being given by the phase value of the sine signal (SIN) and/or of the cosine signal (COS) in said interval.

11. A vehicle, in particular an automotive vehicle, comprising a sensor (20) as claimed in claim 2, a drive shaft (11) and a target (14) made at least in part from a conductive material, mounted on said drive shaft (11) in order to permit the sensor (20) to determine the position of the shaft (11).

12. A vehicle, in particular an automotive vehicle, comprising a sensor (20) as claimed in claim 3, a drive shaft (11) and a target (14) made at least in part from a conductive material, mounted on said drive shaft (11) in order to permit the sensor (20) to determine the position of the shaft (11).

13. A vehicle, in particular an automotive vehicle, comprising a sensor (20) as claimed in claim 4, a drive shaft (11) and a target (14) made at least in part from a conductive material, mounted on said drive shaft (11) in order to permit the sensor (20) to determine the position of the shaft (11).

14. A vehicle, in particular an automotive vehicle, comprising a sensor (20) as claimed in claim 5, a drive shaft (11) and a target (14) made at least in part from a conductive material, mounted on said drive shaft (11) in order to permit the sensor (20) to determine the position of the shaft (11).

15. A method of manufacturing a printed circuit board (21) for an inductive sensor for measuring the position of a shaft (11) of a vehicle in a first direction (X) and a second direction (Y), perpendicular to the first direction (X), from a target (14) mounted on said shaft (11), said printed circuit (21) comprising at least one first receiving coil (23), at least one second receiving coil (24) and at least one transmitting coil (22) surrounding the first receiving coil (23) and the second receiving coil (24) and being configured in order to generate an electrical voltage, the first receiving coil (23) and the second receiving coil (24) being arranged in such a way that the electrical voltage generated by the transmitting coil (22) generates a sine signal in the first receiving coil (23) during detection of the target (14) and a cosine signal in the second receiving coil (24) during detection of the target (14), wherein said method comprises a stage of disposing the first receiving coil (23) and the second receiving coil (24) in a whole number N of portions (23A, 23B, 23C, 24A, 24B, 24C) disposed side by side on the printed circuit (21) in the second direction (Y), each portion (23A, 23B, 23C, 24A, 24B, 24C) extending on the printed circuit (21) in the first direction (X) in such a way as to determine the position of the target (14) in the first direction (X) and in the second direction (Y).

\* \* \* \* \*